United States Patent [19]

Faltynek

[11] 4,329,274

[45] May 11, 1982

[54] HEAT CURABLE ORGANOPOLYSILOXANE COMPOSITIONS

[75] Inventor: Robert A. Faltynek, Schenectady, N.Y.

[73] Assignee: General Electric Company, Schenectady, N.Y.

[21] Appl. No.: 239,718

[22] Filed: Mar. 2, 1981

[51] Int. Cl.$^3$ ............................................. C08L 83/04
[52] U.S. Cl. .................................. 524/862; 525/478; 528/15; 528/31; 528/32
[58] Field of Search ............................. 528/15, 31, 32; 525/478; 260/37 SB

[56] References Cited

U.S. PATENT DOCUMENTS

| | | | |
|---|---|---|---|
| 3,436,366 | 4/1969 | Modic | 528/31 |
| 3,723,567 | 3/1973 | Mink et al. | 528/15 |
| 3,957,713 | 5/1976 | Jeram et al. | 260/37 SB |
| 3,989,667 | 11/1976 | Lee et al. | 528/15 |
| 4,029,629 | 6/1977 | Jeram | 528/15 |
| 4,061,609 | 12/1977 | Bobear | 528/15 |
| 4,234,713 | 11/1980 | LeGrow | 528/15 |

*Primary Examiner*—Melvyn I. Marquis
*Attorney, Agent, or Firm*—William A. Teoli; James C. Davis, Jr.

[57] ABSTRACT

A curable organopolysiloxane composition is provided having a low viscosity in the uncured state and high physical strength in the cured state. A mixture of organopolysiloxane having silicon vinyl containing diorganopolysiloxane and silicon hydride containing siloxane is utilized in combination with a halogen containing platinum tetramer. The heat curable liquid injection moldable mixture exhibits an extended shelf life in the absence of an inhibitor at room temperature and rapidly converts to the solid cured state at 150° C.

9 Claims, No Drawings

HEAT CURABLE ORGANOPOLYSILOXANE COMPOSITIONS

CROSS REFERENCE TO RELATED APPLICATIONS

Reference is made to the copending application of Edward M. Jeram, Ser. No. 169,259, filed July 16, 1980, for Addition Curing Silicone Compositions and assigned to the same assignee as the present invention.

BACKGROUND OF THE INVENTION

The present invention relates to an addition curing system, and more particularly the present invention relates to heat curable organo polysiloxane compositions having a low viscosity in the uncured state and high physical strength in the cured state.

An example of a platinum catalyzed curable organopolysiloxane composition based on the use of a vinyl containing diorganopolysiloxane and a silicon hydride utilizing a platinum catalyst is shown by Modic, U.S. Pat. No. 3,436,366, assigned to the same assignee as the present invention. The composition of Modic utilizes a vinyl containing diorganopolysiloxane which is incorporated into a silicon hydride-olefin-platinum catalyst composition.

Another SiH-olefin system is shown by Jeram et al, U.S. Pat. No. 3,957,713, which utilizes in addition to the combination of a vinyl containing diorganopolysiloxane, a silicon hydride and a platinum catalyst, a low viscosity organopolysiloxane fluid which is terminated at one end with a triorganosiloxy group and the other end a vinyl diorganosiloxy group. Jeram et al also teaches that a silica filler can be utilized, for example, fume silica or precipitated silica which are preferably treated with cyclic polysiloxane or silazane to provide high strength compositions in the cured state.

Additional compositions are shown by Jeram, U.S. Pat. No. 4,041,010, directed to fluorosilicone compositions, based on the use of a fluorosilicone, a vinyl fluorosilicone resin, a silicon hydride cross-linking agent and a platinum catalyst which are particularly useful in liquid injection molding applications. In addition, U.S. Pat. No. 4,029,629, Jeram, teaches the use of a reinforcing filler in combination with the aforedescribed silicone composition.

Experience has shown that liquid injection molding apparatus requires that the uncured organopolysiloxane composition have a viscosity of about 10,000 to 25,000 centipoises at 25° C. so that the organopolysiloxane can be readily injected into the molding chamber and thereafter the composition has to cure at a sufficiently rapid rate. It is also known by those skilled in the art that platinum catalysts, for example, Lamoreaux U.S. Pat. No. 3,220,472 and Karstedt, U.S. Pat. No. 3,715,334 are directed to valuable platinum complexes which can be utilized to effect addition between SiH and vinyl containing diorganopolysiloxane. It is further known that use of such platinum catalyst with mixtures of silicon hydride and vinyl containing diorganopolysiloxane do not possess sufficient shelf stability at 25° C. to be useful as one component curable organopolysiloxane compositions in the form of a mixture of the platinum catalyst, the silicon hydride and the vinyl containing organopolysiloxane. As a result, inhibitors, for example, Bobear, U.S. Pat. No. 4,061,609, have been development in the form of hydroperoxy compounds. However, inhibitors often have been found to interfere with the functioning of the catalyst, particularly in instances where the inhibitor is employed with the platinum catalyst and the vinyl containing diorganopolysiloxane as part of a two component mixture which can be subjected to elevated temperatures prior to combining the aforementioned ingredients with the silicon hydride component under liquid injection molding conditions.

The present invention is based on the discovery that a halogenated tetameric platinum complex having the formula,

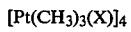

$$[Pt(CH_3)_3(X)]_4 \qquad (1)$$

where X is a halogen radical, for example, chloro, bromo, iodo, etc., can be utilized in combination with one component silicon hydride containing siloxane and vinyl polydiorganosiloxane liquid mixtures without the use of an inhibitor to produce heat curable organopolysiloxane formulations which can be used in a variety of applications to make high strength cured organopolysiloxanes after an extended shelf period as a liquid mixture. The one component liquid mixtures, for example, can be used with or without reinforcing silica fillers in various applications, such as liquid injection molding. In addition, the platinum catalyst of formula (1) can be utilized in combination vinyl containing polydiorganosiloxane at elevated temperatures in absence of an inhibitor and thereafter combined with a silicon hydride as part of a two component liquid injection molding formulation. Unlike the platinum catalysts of the prior art, which often react with an inhibitor, rendering the platinum catalyst less effective as part of a two component liquid injection molding organopolysiloxane formulation, the tetameric platinum catalysts of formula (1) are not subject to prior "poisoning" because these halogenated tetameric complexes of platinum do not require an inhibitor. In addition, inhibitors often have been found to adversely affect the physical properties of the cured organopolysiloxane.

STATEMENT OF THE INVENTION

A heat curable organopolysiloxane composition comprising
(A) a silicone composition comprising
  (i) 100 parts of a vinyl containing diorganopolysiloxane and
  (ii) 10 to 20 parts of silicon hydride containing siloxane comprising a member selected from the class consisting of silicon hydride resin consisting essentially of chemically combined diorgano hydride siloxy units and $SiO_2$ units, linear hydride polysiloxane consisting essentially of chemically combined hydro organosiloxy units and diorganosiloxy, a liner hydride polysiloxane coupler consisting essentially of chemically combined diorganosiloxy units and terminal diorgano hydride siloxy units, and mixtures thereof
(B) an effective amount of the platinum catalyst of formula (1).

Certain of the platinum catalysts of formula (1), for example, the corresponding iodo compound, was first prepared by Pope and Peachey in 1909 from methyl magnesium iodide and platinum tetrachloride, W. J. Pope and S. J. Peachey, J. Chem. Soc. (1909) 571. The corresponding chloro and bromo analogs can be prepared from the appropriate Grignard reagents. An effective amount of the platinum catalyst of formula (1)

has been found to be that amount of catalyst which is sufficient to provide at least 2 ppm to 100 ppm of platinum and preferably from 20 ppm to 30 ppm based on the weight of heat curable organopolysiloxane composition.

The vinyl containing diorganopolysiloxane or "vinylsiloxane" utilized as one of the principal ingredients in the heat curable organopolysiloxane compositions of the present invention can have a viscosity of from about 100 to 200,000 centipoises. The vinyl siloxane is included within the following formula:

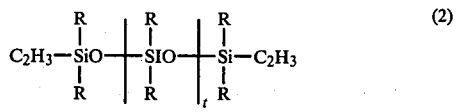  (2)

where $C_2H_3$ is vinyl and R is selected from monovalent hydrocarbon free of olefinic unsaturation and t is a positive integer having a value sufficient to provide a vinyl siloxane viscosity of from about 100 to 200,000 centipoises at 25° C. Preferably, R is selected from alkyl radicals of 1 to 8 carbon atoms such as methyl, ethyl, propyl; mononuclear aryl radicals such as phenyl, methylphenyl, ethylphenyl; cycloalkyl radicals, cycloheptyl and haloalkyl radicals such as 3,3,3-trifluoropropyl. Preferably, the vinyl siloxane has terminal units of the formula, $$C_2H_3(CH_3)_2SiO_{0.5}$$

which can vary from about 0.05 to about 3.5 and preferably from 0.14 to about 2 mole percent.

The vinylsiloxane of Formula (2) is generally prepared by equilibrating the appropriate cyclo tetrasiloxane with appropriate vinyl terminated low molecular weight polysiloxane chain-stoppers. The chain-stopper is preferred for such equilibration reaction and is preferably a low molecular weight vinyl terminated polysiloxane compounds such as a disiloxane, trisiloxane, tetrasiloxane and so forth. These low molecular weight vinyl terminated polysiloxane polymers are produced by hydrolyzing the appropriate chlorosilanes particularly vinyl diorganochlorosilanes along with diorganodichlorosilanes to produce the desired chain-stopper. This chain-stopper is then taken in a relatively pure form and equilibrated along the cyclotetrasiloxanes with the appropriate substitute groups in the presence of a catalyst to produce the desired vinyl siloxane having a viscosity varying from 100 to 200,000 centipoises at 25° C. The catalyst that is utilized is preferably a mild acid catalyst, such as toluene, sulfonic acid or an acid treated clay such as filtrol, which a sulfuric acid activated clay manufactured and sold by Filtrol Corporation of Los Angeles, Calif. When the equilibration has proceeded to the point where about 85% of the cyclopolysiloxanes have been converted to the linear polymer, the acid catalyst is neutralized with a base or simply filtered out in the case of the acid activated clay to leave behind the linear polymer. Preferably, excess cyclics are stripped off so that the linear polymer will have a low volatile content and be relatively pure. There can also be utilized an alkali metal hydroxide as the catalyst such as for instance potassium or sodium hydroxide.

Included within the silicon hydride containing siloxane, or "silicon hydride" is a hydride "coupler", having the formula,

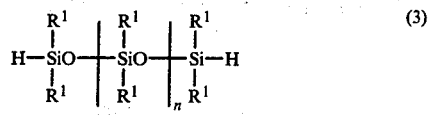  (3)

where $R^1$ is monovalent hydrocarbon radicals free of olefinic unsaturation and n is an integer having a value sufficient to provide the "coupler" with a viscosity of 1 to 500 centipoises at 25° C. and from about 3 to 9 mole percent of diorganohydride siloxy units, based on the total moles of chemically combined siloxy units in the linear hydride polysiloxane.

In addition to the silicone hydride coupler of formula (3), the silicon hydride used in the heat curable polysiloxane compositions of the present invention also can include cross-linking agents such as hydride resins consisting essentially of the following chemically combined units:

units and $SiO_2$ units, where the $R^2+H$ to Si ratio varies from 1.0 to 2.7 and a hydride resin having chemically combined units of the formula,

with $SiO_2$ and $(R^4)_2SiO$ units where the $R^3+R^4+H$ to Si ratio varies from 1.2 to 2.7, where $R^2$, $R^3$ and $R^4$ are monovalent hydrocarbon radicals free of olefinic unsaturation.

These silicon hydrides can be simply produced in the controlled hydrolysis of the corresponding hydride chlorosilanes in the presence of hydrocarbon organic solvent. For the resin containing only monofunctional units and tetrafunctional units, a hydrogen diorganochlorosilane is hydrolyzed along with a tetrachlorosilane to produce the desired resin. In the case of the resin containing the monofunctional siloxy units, the difunctional siloxy units, and the tetrafunctional siloxy units, there is hydrolyzed a hydrogen diorgano dichlorosilane, a tetrachlorosilane and a diorganodichlorosilane in the desired ratios to produce the desired resins. Most information as to the process by which said resins are produced, one is referred to the patent of E. M. Jeram, U.S. Pat. No. 4,040,101 which is hereby incorporated by reference.

In place of hydride resins, the silicon hydride also includes linear hydrogen containing polysiloxane having the formula,

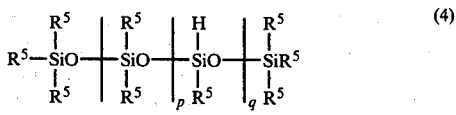  (4)

where $R^5$ is a monovalent hydrocarbon radical free of olefinic unsaturation, and p and q are integers which have values which can vary to provide a polymer viscosity of from 1 to 1,000 centipoises at 25° C. and wherein the polysiloxane has from 0.04 to 1.4 by weight of hydrogen.

The silicon hydride of formula (4) can be produced by equilibrating the appropriate hydrogen cyclopolysiloxane with the appropriate cyclo polysiloxane containing $R^5$ substituent groups, in the presence of disiloxane, trisiloxane, and other low molecular weight linear triorganosiloxy end-stopped chain-stoppers. The process is much the same as producing the vinyl containing polymer; however, "such hydride cross-linking agents" may be made by an alternate process. This alternate process comprises hydrolyzing the appropriate chlorosilanes in water along or in the presence of a hydrocarbon solvent to produce a mixture of cyclics and linear hydride polymers of formula (4) and thereafter stripping the mixture of cyclics.

In formulas (3) and (4) and the chemically combined units described above, $R^1$, $R^2$, $R^3$, $R^4$ and $R^5$ can be the same of different radicals selected from the group consisting of alkyl radicals of 1 to 8 carbon atoms such as methyl, ethyl, propyl, etc.; cycloalkyl radicals such as cyclohexyl, cycloheptyl, etc.; mononuclear aryl radicals such as phenyl, methyl, ethyl phenyl, etc.; and haloalkyl radicals such as 3,3,3-trifluoropropyl. The hydride coupler is prepared by either a hydrolysis process or by acid catalyzed equilibration process. In the equilibration process the appropriate cyclotetrasiloxanes are equilibrated a low molecular weight a hydrogen terminated chain-stoppers, such as a dihydrogen tetraorgano disiloxane. The acid catalyzed equilibration reaction is much the same as the disclosed for the production of the vinyl containing base polymer. By the hydrolysis process, the appropriate hydrogen diorganochlorosilanes are hydrolyzed with the appropriate amount of diorganodichlorosilanes to produce the desired polymer of formula (3) above. When the hydride coupler is produced, it can be separated from the undesirable amount of cyclics by stripping.

The hydride coupler and hydride cross-linker is preferably mixed with the vinyl siloxane to form a single package, while some vinyl siloxane is preferably mixed with the platinum catalyst to form another package. When it is desired to cure the composition, the two packages are simply mixed together and allowed to cure either gradually at room temperature or rapidly at elevated temperatures, that is, temperatures above 100° C.

To obtain the high physical strength of the composition, there may be incorporated from 5 to 100 parts by weight of a filler based on a 100 parts of the base vinyl siloxane. A filler can be selected from fumed silica, precipitated silica and mixtures thereof. Preferably less than 50 parts by weight of filler per 100 parts by weight of the vinyl siloxane is utilized. In place of the reinforcing filler such as fumed silica and precipitated silicas, there may be utilized extending fillers which do not unduly increase the viscosity of the composition in the uncured state, but increasing to some extent the tensile strength of the composition. The reinforcing and extending fillers are, for instance, titanium dioxide, lithopone, zinc oxide, zirconium silicate, silica aerogel, iron oxide, diatomaceous earth, calcium carbonate, silazane treated silicas, glass fibers, magnesium oxide, chromic oxide, zirconium oxide, aluminum oxide, alpha quartz, calcined clay, carbon, graphite, cork, cotton, synthetic fibers and so forth.

For liquid injection molding applications, it has been found desirable to limit the viscosity below 500,000 centipoises at 25° C. and more preferably, below 200,000 centipoises at 25° C.

One method of increasing the tensile strength of the composition without unduly increasing the uncured viscosity is to incorporate a vinyl containing resin in the composition. Accordingly, per 100 parts by weight of the vinyl siloxane, there may be present from 10 to 100 parts by weight of an organo polysiloxane copolymer having chemically combined $(R^6)_3SiO_{0.5}$ units and $SiO_2$, where $R^6$ is a radical selected from the class containing of vinyl radicals, alkyl radicals and aryl radicals, and fluoroalkyl radicals of 1 to 8 carbon atoms with a ratio of monofunctional units and tetrafunctional units, is from 5:1 to 1:1 and where from about 2.5 to 10 mole percent of the silicon atoms contains silicon bonded vinyl groups.

A somewhat different procedure which also can be used in the composition to increase the tensile strength of the cured composition without unduly increasing the viscosity of the uncured total composition is by incorporating, per 100 parts of the vinyl siloxane, from 10 to 100 parts by weight of an organo polysiloxane copolymer having chemically combined $(R^7)_3SiO_{0.5}$ units, $(R^7)_2SiO$ units and $SiO_2$ units, where $R^7$ is a radical selected from the class consisting of vinyl radicals, aryl radicals, alkyl radicals, alkyl radicals and fluoroalkyl radicals with a ratio of monofunctional units, difunctional units is from 0.5:1 to 1:1 and the difunctional units are present in an amount equal from about 1 to 10 mole percent based on the total number of siloxane units in the copolymer and where from about 2.5 to 10 mole percent of the silicon atoms contains silicon bonded vinyl groups. For information as to the utilization of such resins in addition curing compositions one is referred to the issued patent of F. J. Modic, U.S. Pat. No. 3,436,366, which is hereby incorporated by reference. In the above units of the resin, $R^7$ has been disclosed as being selected from vinyl radicals, aryl radicals, and alkyl radicals and fluoroalkyl radicals, more preferably, $R^7$ is selected from vinyl radicals, alkyl radicals of 1 to 8 carbon atoms, phenyl radicals and 3,3,3-trifluoropropyl radicals.

The vinyl siloxane also can include a polysiloxane polymer having a vinyl group at one terminal position of the siloxane chain and a triorgano siloxy group on the other terminal position of the polysiloxane chain. Accordingly, per 100 parts of the vinyl siloxane containing polymer, there may be utilized from 5 to 40 parts by weight a diorganopolysiloxane of the formula,

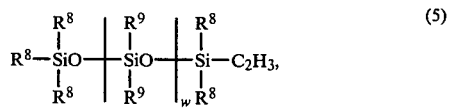

where $R^8$ is a monovalent hydrocarbon radical free of olefinic unsaturation, and $R^9$ is monovalent hydrocarbon radical, and w is an integer having a positive value sufficient to provide a viscosity of the diorganopolysiloxane varying from 50 to 50,000 centipoises at 25° C.

In formula (5), $R^8$ is more particularly an alkyl radical of 1 to 8 carbon atoms, a phenyl radical or a 3,3,3-trifluoropropyl radical, where $R^9$ can be selected from $R^8$ radicals. These polymers and their use in such SiH-olefin-platinum catalyst compositions are further shown in U.S. Pat. No. 3,957,713, Jeram et al which is incorporated herein by reference.

In order that those skilled in the art will be better able to practice the present invention, the following examples are given by way of illustration and not by way of limitation. All parts are by weight.

EXAMPLE 1

Approximately 3.3 parts of thoroughly dried and deacidified platinum tetrachloride was added to a rapidly stirring mixture of 5.8 parts of methylmagnesium iodide in 100 parts of tetrahydrofuran. After the addition was completed, the resulting dark red solution was hydrolyzed and extracted with toluene until the organic layer remained colorless. Stripping the combined extracts provided a 68% yield or 2.4 parts of an orange-yellow solid having a melting point of 188°–190° C. The product was then washed with pentane at −78° C. Based on method of preparation, the product was $[Pt(CH_3)_3I]_4$.

A gel time study was performed with various platinum catalysts with a mixture of 10 parts of a vinyl chain-stopped polysiloxane and 1 part of a liquid organo hydrogen polysiloxane as shown in Modic U.S. Pat. No. 3,436,366, assigned to the same assignee as the present invention. The vinyl chain-stopped polysiloxane was more particularly a mixture of 125 parts of a dimethylvinyl end-stopped polydimethylsiloxane fluid having a viscosity in the range of 3,000–4,000 centipoises and 42 parts of a dimethylvinyl end-stopped polydimethylsiloxane resin having about 2 mole percent chemically combined dimethylvinylsiloxy units. The liquid organo hydrogen polysiloxane was a dimethyl hydrogen end-stopped polydimethylsiloxane fluid having a viscosity of less than about 1,000 centipoises at 25° C.

The liquid vinyl chain-stopped polysiloxane was mixed with the liquid organo hydrogen polysiloxane prior to catalyst addition. Gel times were run on a Sunshine Instrument Timer in 13 mm OD test tubes. The following results were obtained, where "Faltynek" is the platinum catalyst utilized in the practice of the present invention, Lamoreaux is 4($H_2PtCl_6$/N-Octanol) as described in U.S. Pat. No. 3,220,972 and Karstedt is ($Pt^0$/divinyltetramethyldisiloxane) as shown in U.S. Pat. No. 3,715,334:

TABLE 1

| Catalyst | Temp. °C. | PPM Platinum | Gel Time (min) |
|---|---|---|---|
| Faltynek | 25 | 30 | ≦35,000 |
| Lamoreaux | 25 | 35 | 384 |
| Karstedt | 25 | 25 | 40 |
| Faltynek | 52 | 30 | 1,120 |
| Lamoreaux | 52 | 18 | 337 |
| Karstedt | 50 | 25 | 8 |
| Faltynek | 100 | 3 | 94 |
| Lamoreaux | 100 | 4 | 25 |
| Karstedt | 100 | 4 | 14 |
| Faltynek | 155 | 3 | 7 |
| Lamoreaux | 155 | 3 | 3 |
| Karstedt | 150 | 4 | 3 |

The above results show that the platinum catalyst of the present invention "Faltynek" provides a longer pot life and temperatures in the range of from 25° C. to 155° C. than platinum catalyst of the prior art.

EXAMPLE 2

A heat curable organopolysiloxane composition was prepared by incorporating an effective amount of the halogen containing platinum tetramer of Example 1 into a vinyl siloxane and thereafter mixing the vinyl siloxane "component A", with a silicon hydride siloxane "component B" for 10 to 15 minutes in a planetary mixer. The resulting heat curable organopolysiloxane compositions contained 20 ppm of platinum.

Component A consisted of 53 parts of a vinyl end-stopped polydimethylsiloxane fluid having a viscosity of 50,000–80,000 centipoises at 25° C., 10 parts of a dimethylvinyl end-stopped polydimethylsiloxane resin having about 2 mole percent of chemically combined dimethylsiloxy units, 4 parts of a dimethylvinyl end-stopped polydimethylsiloxane fluid having about 0.06 mole percent of dimethylvinylsiloxy units and a viscosity of 40,000 centipoises, 12 parts of fumed silica treated with hexamethyl disilazane and 8 parts of ground quartz having a final viscosity of about 1,000,000 centipoises. Component B consisted of 5 parts of dimethyl hydrogen end-stopped polydimethylsiloxane fluid having a viscosity of 1,000 centipoises at 25° C., 53 parts of vinyl end-stopped polydimethylsiloxane fluid having a viscosity of 50,000–80,000 centipoises, 10 parts of a dimethylvinyl end-stopped polydimethylsiloxane resin having about 2 mole percent of chemically combined dimethylsiloxy units, 12 parts of silazane treated fumed silica and 7 parts of ground quartz.

The above heat curable organopolysiloxane composition was injected into a mold cavity and heated for 15 minutes at 350° F. and post baked for 4 hours at 400° F. The following properties were obtained in the resulting cured slab after the initial 15 minute cure, followed by the 4 hour post bake period, where "H" is hardness (shore A), "T" is tensile (psi), "E" is elongation (%) and "T'" is tear(pi).

H 43/60
T 820/900
E 590/500
T' 120/160

The above procedure was repeated, except that the platinum concentration was reduced to 4 ppm.

H 43/50
T 820/1030
E 590/300
T' 120/150

The above results show that the platinum catalyst of the present invention can be used to make valuable compression molded parts when utilized in combination with curable organopolysiloxane compositions.

EXAMPLE 3

In accordance with the procedure of Example 2, another liquid injection molding mixture was prepared consisting of a mixture of a vinyl siloxane and a silicon hydride siloxane and 20 ppm of the platinum tetramer of Example 1.

Component A and component B of the liquid injection moldable composition was substantially the same as component A and component B of the liquid injection molding composition of Example 2, except that in place of the 10 parts of the dimethylvinyl end-stopped polydimehylsiloxane resin having about 2 mole percent of chemically combined dimethylsiloxy units, there was utilized respectively, 38 parts of the same dimethylvinyl end-stopped polydimethylsiloxane resin in the liquid injection molding composition.

The above heat curable organopolysiloxane composition was injected into a mold cavity and heated for 15 seconds at 400° F. and then post baked at 400° F. for 4 hours. The following properties were obtained where H, T, E and T' are as defined in Example 2:

H 44/57
T 880/900
E 530/320
T' 130/110

The above results show that a high strength, shaped, substantially cured organopolysiloxane composition was obtained after 15 seconds at 400° F. which shows that the heat curable organopolysiloxane composition containing the platinum tetramer of the present invention is a valuable injection moldable composition.

EXAMPLE 4

A pot life study was made to determine the stability of mixtures of 20 ppm of various platinum catalysts in a vinyl siloxane corresponding to component A of Example 2. It has been found that if the platinum catalyst reacts with silicon vinyl siloxy units, a liquid injection moldable mixture can gel within 4 to 8 hours on mixing the vinyl siloxane "component A" with the silicon hydride siloxane "component B".

In order to determine the stability of the Faltynek catalyst as compared to the Lamoreaux catalyst of Example 1, vinyl siloxane mixtures were prepared containing 20 ppm of the respective catalysts and held for 5 days at 70° C. The vinyl siloxane utilized was the same as shown in Example 2, referred to as component A, except that there was utilized 38 parts of the dimethylvinyl end-stopped polydimethylsiloxane resin instead of 10 parts as shown in Example 2. The respective platinum containing vinyl siloxanes were then cooled to 25° C. and mixed with the silicon hydride siloxane "component B" of Example 2. The resulting liquid injection moldable mixtures were tested for viscosity increases. The following results were obtained:

| Pt Catalyst | Gel Time |
|---|---|
| Lamoreaux | 8 hr. |
| Faltynek | ≦3 weeks |

The above results show that the Faltynek catalyst of the present invention does not react with vinyl radicals attached to silicon after extended periods at temperatures as high as 70° C. As a result, an inhibitor is not required and liquid injection molding compositions as one package or two package systems without the need for refrigeration are provided. In addition, a solution of 0.05 mole of the platinum tetramer of Example 1 in trimethyl silane was found to remain unchanged for at least 16 hours at 150° C. based on NMR spectra.

Although the above examples are directed to only a few of the very many variables which can be employed in the practice of the method of the present invention to make the heat curable organopolysiloxane compositions, it should be understood that the present invention is directed to the use of a much broader variety of vinylsiloxane and silicon hydride siloxane as well as halogen containing platinum tetramer which are shown in the description preceding these examples.

What I claim as new and desire to secure by Letters Patent of the United States is:

1. A heat curable organopolysiloxane composition comprising
   (A) a silicone composition comprising
      (i) 100 parts of a vinyl containing diorganopolysiloxane and
      (ii) 10 to 20 parts of a silicon hydride containing siloxane, and
   (B) an effective amount of platinum catalyst having the formula, $[Pt(CH_3)_3(X)]_4$, whereby the need for an inhibitor is avoided, where X is a halogen radical selected from iodo, chloro and bromo.

2. A heat curable organopolysiloxane composition comprising,
   (A) a silicone composition comprising,
      (i) 100 parts of a vinyl containing diorganopolysiloxane and
      (ii) 10 to 20 parts of silicon hydride containing siloxane comprising a member selected from the class consisting of silicon hydride resin consisting essentially of chemically combined diorgano hydride siloxy units and $SiO_2$ units, linear hydride polysiloxane consisting essentially of chemically combined hydro organosiloxy units and diorganosiloxy, a linear hydride polysiloxane coupler consisting essentially of chemically combined diorganosiloxy units and terminal diorgano hydride siloxy units, and mixtures thereof, and
   (B) an effective amount of the platinum catalyst having the formula, $[Pt(CH_3)_3(X)]_4$, where X is a halogen radical selected from iodo, chloro and bromo.

3. A heat curable organopolysiloxane composition in accordance with claim 1, where the platinum catalyst has the formula, $[Pt(CH_3)_3I]_4$.

4. A heat curable organo polysiloxane composition of claim 1, where the vinyl containing diorganopolysiloxane is a vinyl terminated polydimethylsiloxane having a viscosity in the range of from 3,000 to 80,000 centipoises at 25° C.

5. A heat curable composition in accordance with claim 2, where the vinyl containing diorganopolysiloxane is a mixture of a vinyl end-stopped polydimethylsiloxane having a viscosity of from 50,000 to 80,000 centipoises, a dimethylvinyl-terminated polydimethylsiloxane resin having about 2 mole percent of chemically combined vinyl dimethylsiloxy units, a dimethylvinyl-terminated polydimethylsiloxane fluid having viscosity of about 40,000 centipoises, the silicon hydride siloxane is a dimethyl hydrogen-terminated polydimethylsiloxane fluid having a viscosity of about 1,000 centipoises, and the heat curable composition is reinforced with a mixture of fumed silica and ground quartz.

6. A heat curable composition in accordance with claim 1 containing a silica filler.

7. A mixture of a vinyl containing polydiorganosiloxane having a viscosity of from 3,000 to 80,000 centipoises at 25° C. and an amount of a platinum catalyst having the formula,

[Pt(CH₃)₃I]₄, which is sufficient to provide from 2 to 100 ppm of platinum, where said mixture of vinyl containing siloxane and platinum catalyst is stable at temperatures up to 150° C. for an extended period of time.

8. In the method for effecting addition between a vinylsiloxane and a silicon hydride siloxane in the presence of a platinum catalyst, whereby an inhibitor is required to lengthen the shelf life of the resulting mixture at ambient temperatures, the improvement which comprises utilizing as the platinum catalyst an effective amount of a halogen containing platinum tetramer having the formula,

[Pt(CH₃)₃(X)]₄ whereby the need for an inhibitor is avoided, where X is a halogen radical selected from iodo, chloro and bromo.

9. A method in accordance with claim 8, where the platinum catalyst is

[Pt(CH₃)₃I]₄.

* * * * *